(12) United States Patent
Nagata et al.

(10) Patent No.: US 6,481,660 B2
(45) Date of Patent: Nov. 19, 2002

(54) WEBBING RETRACTOR

(75) Inventors: Tomonori Nagata, Aichi-ken (JP); Shinji Mori, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/925,035

(22) Filed: Aug. 9, 2001

(65) Prior Publication Data

US 2002/0020776 A1 Feb. 21, 2002

(30) Foreign Application Priority Data

Aug. 15, 2000 (JP) .......................................... 2000-246294

(51) Int. Cl.[7] .............................................. B65H 75/48
(52) U.S. Cl. ..................................... 242/379.1; 280/805
(58) Field of Search ............................ 242/379, 379.1; 280/805, 806; 297/470, 471, 472

(56) References Cited

U.S. PATENT DOCUMENTS

| 4,088,280 A | * | 5/1978 | Arlauskas et al. ........ 242/379.1 |
| 4,323,205 A | * | 4/1982 | Tsuge et al. ............. 242/379.1 |
| 5,618,006 A | * | 4/1997 | Sayles .................... 242/379.1 |
| 5,788,177 A | | 8/1998 | Keller et al. |
| 5,924,641 A | * | 7/1999 | Keller et al. ............. 242/379.1 |
| 5,934,597 A | * | 8/1999 | Ludwig ................... 242/379.1 |
| 5,975,451 A | * | 11/1999 | Kawamoto ............... 242/379.1 |
| 6,131,843 A | | 10/2000 | Singer et al. |
| 6,216,972 B1 | | 4/2001 | Röhrle |

FOREIGN PATENT DOCUMENTS

| DE | 298 16 280 | 1/1999 |
| EP | 0 703 124 | 3/1996 |

OTHER PUBLICATIONS

European Search Report, dated Jan. 14, 2002.

* cited by examiner

*Primary Examiner*—William A. Rivera
(74) *Attorney, Agent, or Firm*—Nixon Peabody LLP; Thomas W. Cole

(57) ABSTRACT

A webbing retractor having a force limiter mechanism whose energy absorption amount is large and which can reliably absorb energy. To this end, a wire is provided as an energy absorbing member having a fixing portion, a curved portion and a fit-in portion. When a spool rotates in a pull-out direction relative to a lock base, the fit-in portion is forcibly pulled-out from a fit-in hole and deformed while being strongly rubbed. Here, the fit-in portion deforms along an imaginary extended line of the curved portion. Thus, breaking of the wire due to concentration of shearing stress at one portion of the wire can be prevented. Deformation load which is applied to the wire can be reliably applied as force limiter load until a position of relative rotation of the spool with respect to the lock base which position is set in advance.

14 Claims, 3 Drawing Sheets

WEBBING RETRACTOR

BACKGROUND OF THE INVENTION

1. Field of the Invention

The present invention relates to a webbing retractor which, when a vehicle rapidly decelerates, tenses a webbing in a direction of restraining a vehicle occupant. In particular, the present invention relates to a webbing retractor which, when pulling-out of a webbing is impeded, allows the webbing to be pulled-out by a predetermined amount and can absorb energy.

2. Description of the Related Art

A webbing retractor which forms a seat belt device of a vehicle is usually provided with a lock mechanism which, at the time the vehicle rapidly decelerates, locks a spool (take-up shaft) so as to impede pulling-out of a webbing.

One example of such a lock mechanism is a type which includes a lock base and a lock device. The lock base is disposed coaxially with the spool and is connected so as to be integral with the spool. At the time of rapid deceleration of the vehicle, the lock device engages with the lock base so as to impede rotation of the lock base, and indirectly impedes rotation of the spool.

Further, such webbing retractors are equipped with a so-called force limiter mechanism which, when pulling-out of the webbing is impeded, allow the webbing to be pulled-out by a predetermined amount in order to limit the load applied to the vehicle occupant by the webbing to a given amount or less, and absorb energy. An example of this force limiter mechanism is a structure in which one end portion of the torsion bar, which is disposed coaxially with the spool, is fixed to the spool, and the other end portion is connected so as to be integral with the aforementioned lock base. In this type of force limiter mechanism, relative rotation of the spool with respect to the lock base arises due to the locking of the lock base by the lock device at the time when the vehicle rapidly decelerates, and due to the tensile force applied to the webbing belt from the body of the vehicle occupant which attempts to move toward the front of the vehicle when the vehicle rapidly decelerates. Due to the torsion bar being deformed in a twisting direction by the rotational force of this relative rotation, a predetermined amount of rotation of the spool is permitted while energy is absorbed.

This absorbed energy is determined by the product of the load applied to the webbing (force limiter load) and the webbing pull-out amount (amount of rotation of the spool). At the webbing retractor, the force limiter load and the allowable amount of rotation of the spool (the twisting limit of the torsion bar) are given, and there are limits on the amount of energy which can be absorbed.

Higher energy absorption amounts are preferable. Thus, structures have been conceived of in which an energy absorbing member other than the torsion bar, which energy absorbing member absorbs energy by deforming, is provided between the lock base and the spool. However, with such an energy absorbing member, there is a high possibility that, due to the spool rotating relative to the lock base, stress such as shearing stress or the like will concentrate at a portion of the energy absorbing member such that the energy absorbing member will break. If the energy absorbing member breaks, after breakage, energy absorption by the energy absorbing member is not possible. Thus, further improvement is desired.

SUMMARY OF THE INVENTION

In view of the aforementioned, an object of the present invention is to provide a webbing retractor having a force limiter mechanism whose energy absorption amount is large and which can reliably absorb energy.

A webbing retractor relating to a first aspect of the present invention is a retractor of a webbing belt which is elongated and belt-shaped and restrains a body of a vehicle occupant in a state in which the webbing belt is applied to the vehicle occupant, the webbing retractor comprising: (a) a take-up shaft to which a proximal end portion of the webbing belt is anchored, and due to the take-up shaft rotating in one direction around an axis of the take-up shaft, the take-up shaft takes-up the webbing belt from a proximal end side, and due to tensile force, toward a distal end side which is a side opposite to the proximal end portion, being applied to the webbing belt, rotational force in a pull-out direction, which is a direction opposite to a take-up direction, is applied to the take-up shaft; (b) a rotating body which is provided at a side of an axial direction of the take-up shaft so as to be coaxial with and freely rotatable with respect to the take-up shaft; (c) a lock device which restricts rotation of the rotating body at a time a vehicle rapidly decelerates; (d) an energy absorbing member having a fixing portion which is provided eccentric to the take-up shaft and which is fixed to one of the take-up shaft and the rotating body, and the energy absorbing member has a curved portion which is bent from the fixed portion and which curves around an axial center of the take-up shaft in a direction of rotation of another of the take-up shaft and the rotating body with respect to the one of the take-up shaft and the rotating body at a time when the take-up shaft rotates in the pull-out direction relative to the rotating body, and the energy absorbing member has a fit-in portion which is bent from an end portion of the curved portion at a side opposite the fixing portion and which is inserted into the other of the take-up shaft and the rotating body; and (e) a forcibly pulling-out device which, as the take-up shaft rotates in the pull-out direction relative to the rotating body, rotates and pulls the fit-in portion out of the other of the take-up shaft and the rotating body, and forcibly curves the fit-in portion along an extension of a direction of curving of the curved portion.

In the webbing retractor having the above-described structure, when the take-up shaft rotates in-the pull-out direction in a state in which the lock device engages with the rotating body and rotation of the rotating body is limited in a case in which the vehicle rapidly decelerates, the take-up shaft rotates relative to the rotating body. At this time, the fit-in portion of the energy absorbing member, which is fit into the other of take-up shaft and the rotating body, attempts to rotate relative to the fixing portion of the energy absorbing member fixed to the one of the take-up shaft and the rotating body.

However, the curved portion is formed so as to be bent from the fixing portion, and the fit-in portion is formed so as to be bent from the curved portion. (Namely, the fixing portion and the fit-in portion are integral via the curved portion.) Thus, the fit-in portion cannot merely rotate relative to the fixing portion, and the fit-in portion is forcibly pulled-out by the forcibly pulling-out device. Moreover, the fit-in portion, which is bent from the curved portion, is forcibly deformed and curved along an imaginary line extending in the curving direction of the curved portion. The take-up shaft can rotate in the pull-out direction by an amount corresponding to the amount that the fit-in portion is pulled-out by the forcibly pulling-out device. Pulling-out of the webbing belt by an amount corresponding to the permitted amount of rotation is possible, and energy corresponding to an amount of deformation of the fit-in portion is absorbed.

In this way, for example, in a case in which another energy absorbing member is used such as a so-called torsion bar, which is provided at the substantial axial center of the take-up shaft in a state in which one end is fixed to the take-up shaft and the other end is fixed to the rotating body and which twistingly deforms due to relative rotation between the take-up shaft and the rotating body, the amount of absorbed energy, which is due to the energy absorbing effect due to the curving (deformation) of the fit-in portion, is added to the amount of absorbed energy, which is due to the energy absorbing effect of the energy absorbing member such as the torsion bar or the like. Thus, the overall amount of absorbed energy of the webbing retractor can be increased.

However, when the above-described energy absorbing member breaks due to stress concentrating at a portion thereof while the energy absorbing member is in the midst of deforming, no further energy can be absorbed. Thus, here, at the energy absorbing member of the present webbing retractor, the curved portion is provided between the fixing portion and the fit-in portion. As seen from the fixing portion, this curved portion is curved toward the aforementioned other of the take-up shaft and the rotating body (i.e., the one of the take-up shaft and the rotating body into which the fit-in portion is fit) when the take-up shaft rotates in the pull-out direction relative to the rotating body. Namely, when the curved portion is considered to be a portion of the fit-in portion, the curved portion can be considered to be a portion which is plastically deformed in advance in a direction of rotation of the aforementioned other of the take-up shaft and the rotating body (i.e., the one of the take-up shaft and the rotating body into which the fit-in portion is fit) when the take-up shaft rotates in the pull-out direction relative to the rotating body. By plastically deforming the curved portion in advance in this way, the curved portion can easily be deformed in the direction along this deformation, i.e., in the rotating direction of the other of the take-up shaft and the rotating body. Stress does not concentrate at one portion of the energy absorbing member, and the energy absorbing member does not break. In this way, energy can be reliably absorbed during a predetermined period of time which is set in advance.

Figure 3B:
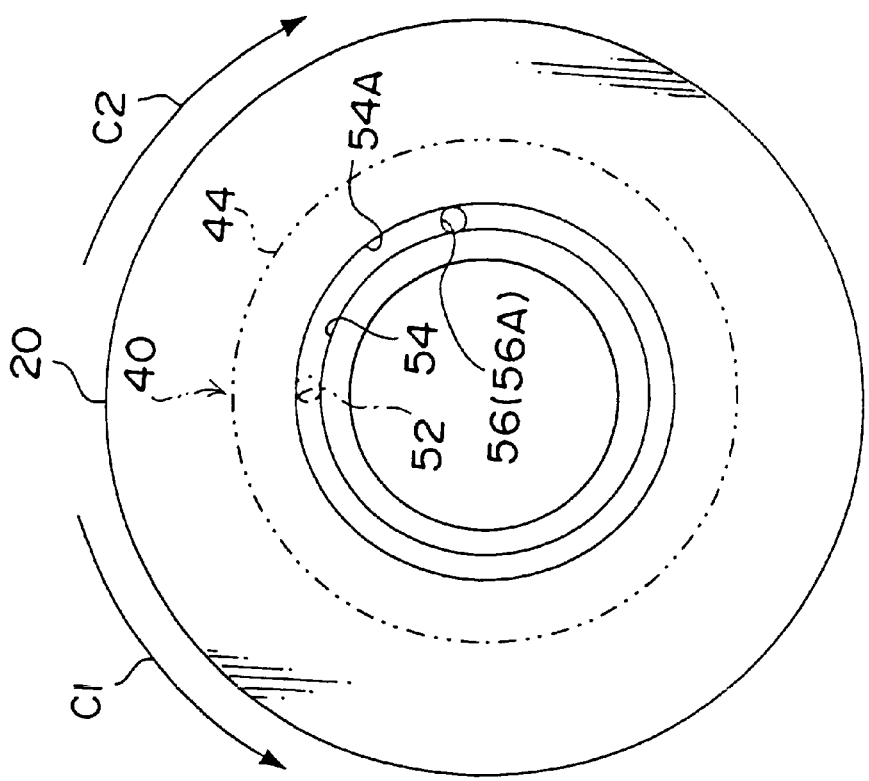
FIG. 3B is a view, as seen from the direction of arrow B of FIG. 1, of a take-up shaft (spool).

Note that, in order to make the positional relationship between the take-up shaft (spool) and the rotating body (lock base) easily understood, the rotating body (lock base) is illustrated by a two-dot chain line in FIG. 3B.

DESCRIPTION OF THE PREFERRED EMBODIMENT

Structure of the Embodiment

Figure 1:
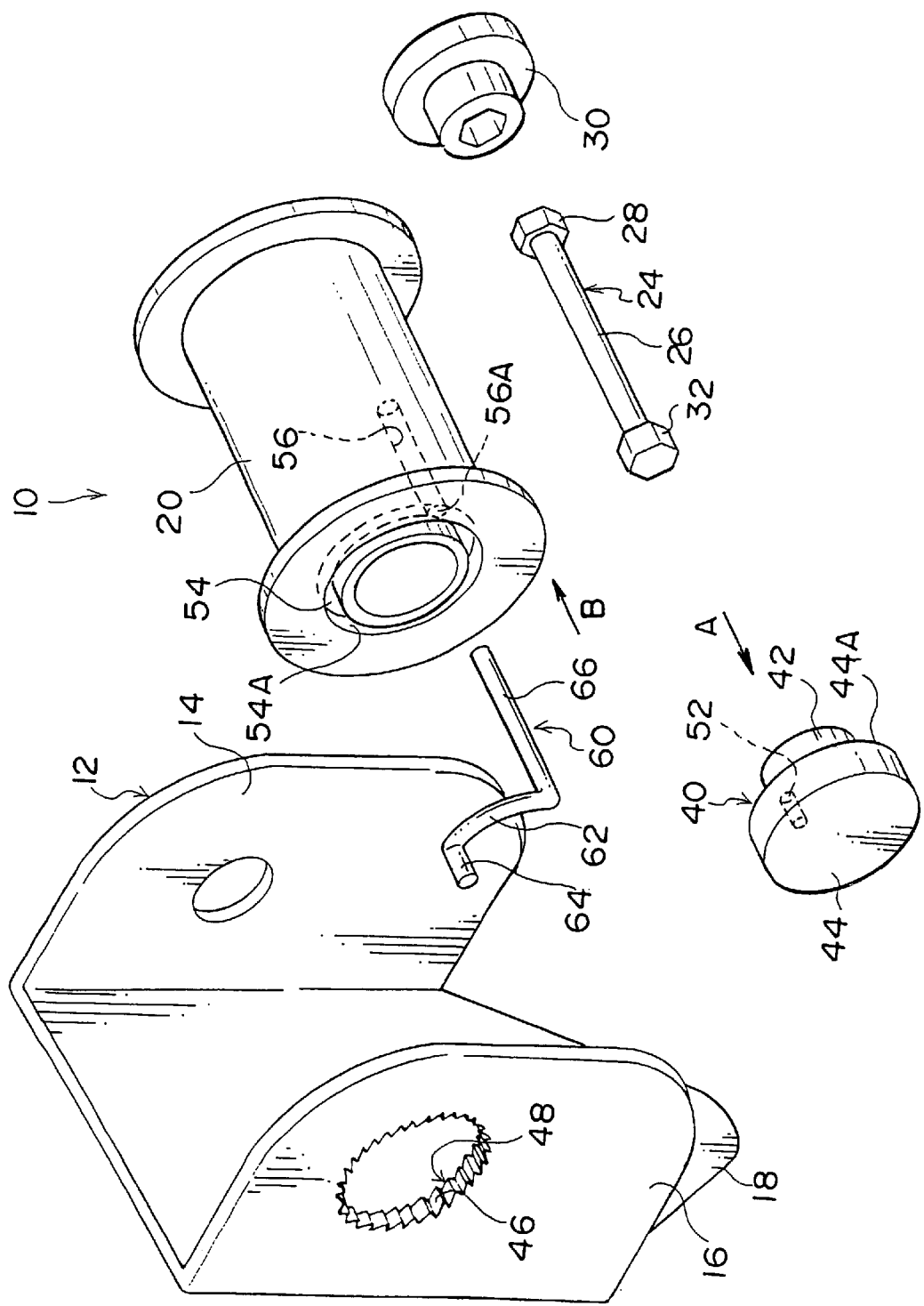
FIG. 1 is an exploded perspective view showing a structure of main portions of a webbing retractor relating to an embodiment of the present invention.
Figure 2:
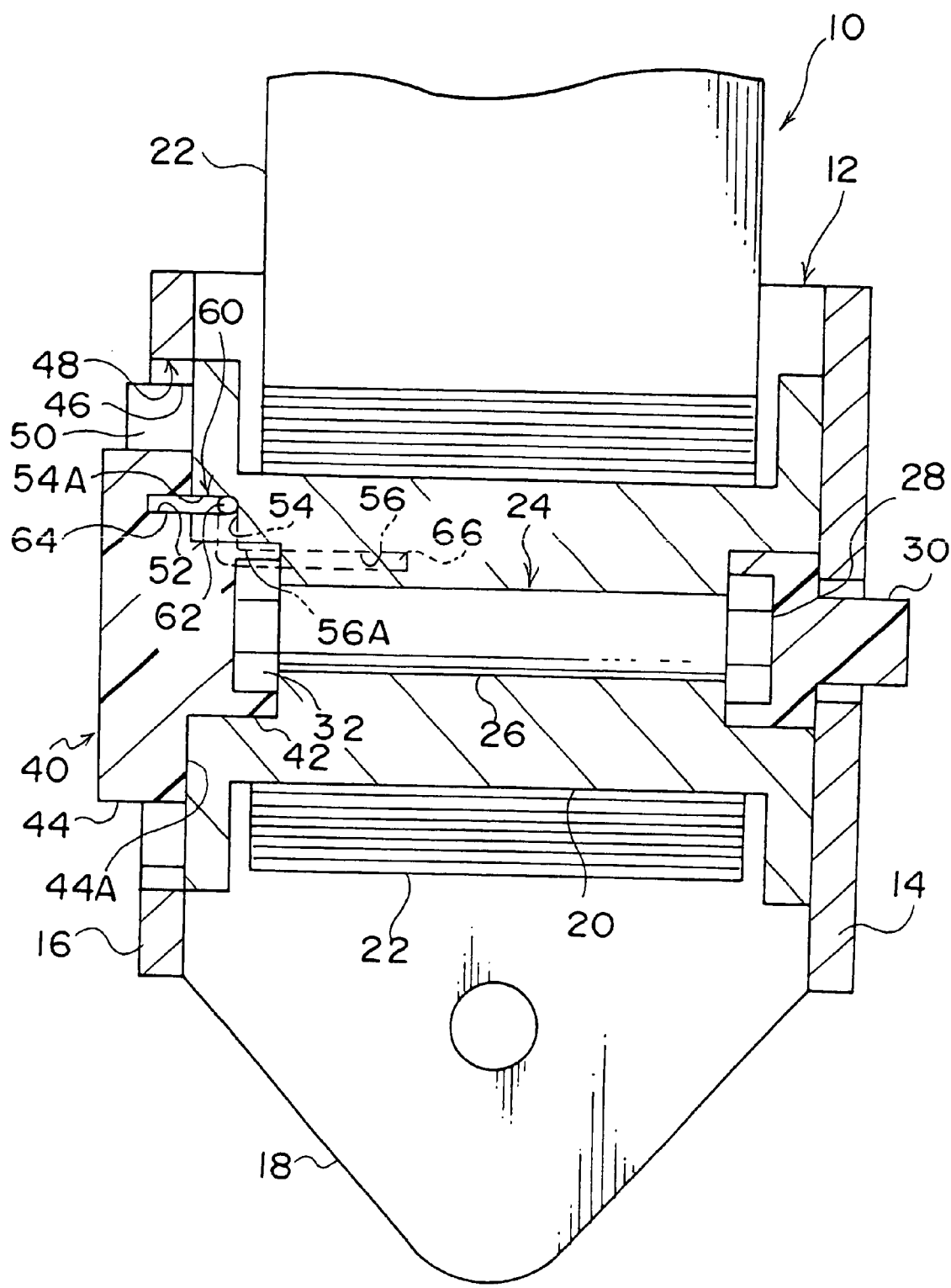
FIG. 2 is a front sectional view showing the structure of the webbing retractor relating to the embodiment of the present invention.

In FIG. 1, the structure of the main portions of a webbing retractor 10 relating to an embodiment of the present invention is illustrated in an exploded perspective view. In FIG. 2, the structure of the webbing retractor 10 is illustrated in a front sectional view.

As shown in FIGS. 1 and 2, the webbing retractor 10 has a frame 12. The frame 12 is formed by a pair of leg plates 14, 16 and a supporting plate 18. The leg plates 14, 16 are plate-shaped and oppose one another along the directions of thickness thereof. The supporting plate 18 connects ones of transverse direction end portions of the leg plates 14, 16, and is fixed to a side of a seat of a vehicle by a fastening device such as a bolt or the like. The frame 12 is therefore formed on the whole in a substantial U-shape as seen in plan view.

A spool 20, which serves as a take-up shaft and whose axial direction is the transverse direction of the supporting plate 18 (the direction in which the leg plate 14 and the leg plate 16 oppose one another), is provided between the leg plate 14 and the leg plate 16 of the frame 12. The proximal end portion of an elongated, belt-shaped webbing belt 22 is anchored onto a portion of the outer periphery of the spool 20. Due to the spool 20 rotating in a take-up direction (the direction of arrow C1 in FIGS. 3A and 3B), the webbing belt 22 is taken-up in layers onto the outer peripheral portion of the spool 20. Due to the webbing belt 22 being pulled toward the distal end side thereof, which is the side not anchored to the spool 20, the spool 20 rotates in a pull-out direction, which is opposite to the take-up direction (i.e., the spool 20 rotates in the direction of arrow C2 in FIGS. 3A and 3B), such that the webbing belt 22 taken-up on the spool 20 is pulled-out.

Note that, after the intermediate portion in the longitudinal direction of the webbing belt 22 passes through a slip joint of a shoulder anchor, which is provided in a vicinity of a center pillar of the vehicle, and then passes through a tongue plate, the distal end portion of the webbing belt 22 is fixed to a support body provided at the vehicle body. (Aforementioned members which are not denoted by reference numerals are not illustrated in-the figures.)

The spool 20 is formed overall in a tube shape, and a torsion bar 24 is accommodated in the interior of the spool 20 so as to be coaxial with the spool 20. The torsion bar 24 has a columnar bar main body 26. A substantially hexagonal-solid-shaped fixing portion 28 is formed at one end portion in the longitudinal direction (the leg plate 14 side end portion) of the bar main body 26. The fixing portion 28 is fixed to a sleeve 30 which is connected and fixed to the spool 20 at one axial direction side (the leg plate 14 side) of the spool 20. The fixing portion 28 is connected integrally to the spool 20 indirectly by the sleeve 30.

At the other end portion in the longitudinal direction (the leg plate 16 side end portion) of the bar main body 26, a substantially hexagonal-solid-shaped fixing portion 32 is formed. The fixing portion 32 is connected and fixed to a lock base 40 which serves as a rotating body and which is disposed at the axial direction other end side (the leg plate 16 side) of the spool 20. The lock base 40 has a substantially cylindrical small diameter portion 42. The small diameter portion 42 is fit into the spool 20 from the axial direction other end side of the spool 20, so as to be coaxial with the spool 20 and so as to basically rotate relative with respect to the spool 20. However, because the fixing portion 32 is integrally connected and fixed to the small diameter portion 42, usually, the small diameter portion 42 does not rotate relative to the spool 20.

A large diameter portion 44, whose diameter is greater than that of the small diameter portion 42, is formed integrally and coaxially with the other axial direction end side (the leg plate 16 side) of the small diameter portion 42. The large diameter portion 44 passes, substantially coaxially, through a ratchet hole 48 which is formed in the leg plate 16, and which is substantially circular, and at whose inner peripheral portion a ratchet 46 is formed.

A lock member 50 serving as a lock device is provided at the large diameter portion 44. When a V gear (not shown), which is provided coaxially with the large diameter portion 44 and so as to be able to rotate relative to the large diameter portion 44, rotates relative to the large diameter portion 44, the lock member 50 meshes with the ratchet 46 of the ratchet hole 48 such that rotation of the large diameter portion 44, i.e., the lock base 40, is limited.

Figure 3A:
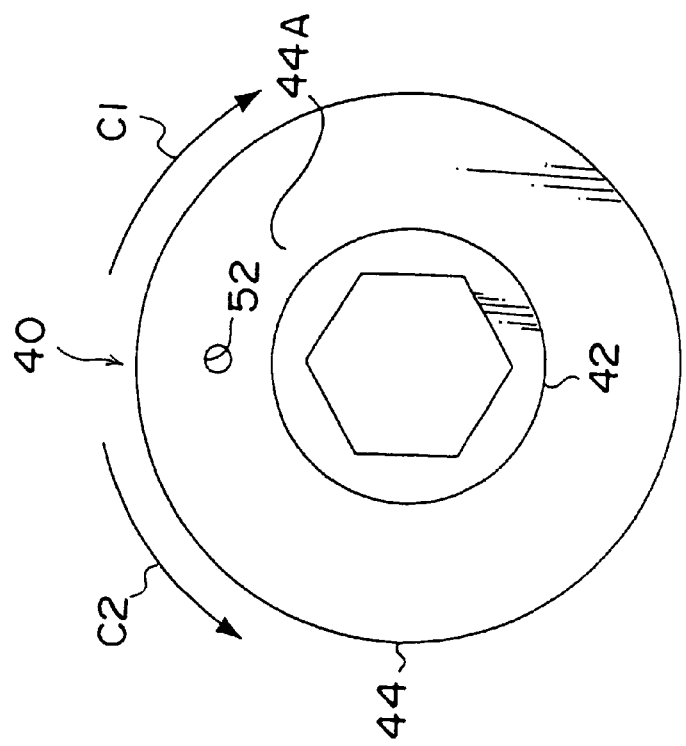
FIG. 3A is a view, as seen from the direction of arrow A of FIG. 1, of a rotating body (lock base)

As shown in FIG. 3A, a fixing hole 52 having a bottom is formed in the large diameter portion 44 of the lock base 40. The fixing hole 52 is eccentric with respect to the axial center of the lock base 40, and opens at an end surface 44A at the side facing the spool 20.

As shown in FIG. 3B, a guide groove 54 is formed in the end surface of the spool 20 at the end surface of the side facing the lock base 40. The guide groove 54 is ring-shaped and is coaxial with the spool 20. The radius of the guide groove is the same as the amount by which the fixing hole 52 is eccentric with respect to the axial center of the large diameter portion 44. Accordingly, as shown in FIG. 3B, the fixing hole 52 overlaps on the guide groove 54 along the axial direction of the spool 20 and the lock base 40, and even if the spool 20 rotates relative to the lock base 40, the fixing hole 52 always overlaps the guide groove 54.

As shown in FIGS. 1 and 3B, a fit-in hole 56 is formed in the spool 20. The fit-in hole 56 is a hole which has a bottom and which opens at the bottom portion of the guide groove 54. The direction of opening thereof is substantially parallel to the axial direction of the spool 20. Here, as described above, the spool 20 and the lock base 40 are connected integrally by the torsion bar 24. In this state in which the spool 20 and the lock base 40 are connected by the torsion bar 24, as shown in FIG. 3B, the fit-in hole 56 is displaced by a predetermined angle, toward the pull-out direction, around the axial center of the spool 20 and the lock base 40. Note that it is not absolutely necessary for the opening direction of the fit-in hole 56 to be parallel to the axial direction of the spool 20, and the opening direction may be inclined with respect to the axial direction of the spool 20.

As shown in FIGS. 1 and 2, a wire 60 serving as an energy absorbing member is disposed at a portion of the inner side of the guide groove 54. The wire 60 has a curved portion 62. The curved portion 62 is curved in an arc so as to correspond to the curvature of the guide groove 54. The entire length of the curved portion 62 corresponds to the length in the pull-out direction from the fixing hole 52 to the fit-in hole 56. The wire 60 is disposed in the guide groove 54 between the fixing hole 52 and the fit-in hole 56.

A fixing portion 64 is formed from one end portion in the longitudinal direction (the fixing hole 52 side end portion) of the curved portion 62. The fixing portion 64 is formed to be bent parallel along the axial direction of the lock base 40 from one end portion in the longitudinal direction of the curved portion 62. Further, in a state in which the distal end side of the fixing portion 64 is inserted into the fixing hole 52, the distal end side of the fixing portion 64 is fixed integrally to the large diameter portion 44 of the lock base 40.

A fit-in portion 66 is formed at the other end portion in the longitudinal direction (the fit-in hole 56 side end portion) of the curved portion 62. The fit-in portion 66 is formed to be bent parallel along the axial direction of the spool 20 from the other end portion in the longitudinal direction of the curved portion 62. The distal end side of the fit-in portion 66 is an accommodated in the fit-in hole 56 so as to be freely slidable along the direction of opening of the fit-in hole 56.

Operation and Effects of the Present Embodiment

Hereinafter, the operation and effects of the present embodiment will be described.

In a seat belt device which is structured so as to include the present webbing retractor 10, when the tongue plate, through which the intermediate portion in the longitudinal direction of the webbing belt 22 passes, is grasped and the webbing belt 22 is pulled-out together with the tongue plate, due to the tensile force applied to the webbing belt 22, the webbing belt 22 which is taken-upon the spool 20 is pulled-out while the spool 20 rotates in the pull-out direction. Next, by engaging and locking the tongue plate with a buckle device provided at the vehicle body at the side of the seat which is opposite the side which the present webbing retractor is provided, the webbing is set in a state of being applied to the vehicle occupant, and the body of the vehicle occupant who is seated in the seat is restrained by the webbing belt 22.

In this state, when the vehicle enters a state of rapid deceleration and this state is detected by a sensing device such as an acceleration sensor, the aforementioned V gear is locked. In this state of a rapid deceleration of the vehicle, the body of the vehicle occupant attempts to move toward the front of the vehicle due to inertia, and the webbing belt 22, which is restraining the body of the vehicle occupant, is pulled by the body of the vehicle occupant which is attempting to move toward the front of the vehicle. Thus, the spool 20 attempts to rotate in the pull-out direction.

Here, because the spool 20 and the lock base 40 are connected integrally via the torsion bar 24, the lock base 40 also attempts to rotate together with the spool 20. In this way, relative rotation arises between the V gear and the lock base 40. The lock member 50 meshes with the ratchet 46 of the ratchet hole 48 formed in the leg plate 16, and the lock member 50 impedes rotation of the lock base 40. Due to the rotation of the lock base 40 being impeded, and thus the rotation of the spool 20 which is integral with the lock base 40, in this state, basically, the webbing belt 22 is not pulled-out from the spool 20, and the restraining of the body of the vehicle occupant by the webbing belt 22 is maintained, and movement of the vehicle occupant toward the front of the vehicle is limited.

Next, in the state in which rotation of the lock base 40 is impeded by the lock member 50, when the tensile force, which is being applied to the webbing belt 22 from the body of the vehicle occupant which is attempting to move toward the front of the vehicle, exceeds a predetermined magnitude, the spool 20 rotates in the pull-out direction relative to the lock base 40 whose rotation is restricted by the lock member 50, and the torsion bar 24 attempts to rotate in the pull-out direction. However, because the other end side in the longitudinal direction of the torsion bar 24 is fixed to the small diameter portion 42 of the lock base 40, the torsion bar 24 cannot rotate in the pull-out direction at this other end side in the longitudinal direction. As a result, the side of the torsion bar 24 further toward the one end than the intermediate portion in the longitudinal direction thereof, attempts to rotate with respect to the other end side, and the torsion bar 24 twistingly deforms. In this way, while the twisting load due to twisting deformation of the torsion bar 24 is applied to the vehicle occupant via the webbing belt as force limiter load, the spool 20 rotates in the pull-out direction with respect to the lock base 40. The webbing belt 22 is pulled-out, and energy is absorbed.

On the other hand, as described above, when the spool 20 rotates in the pull-out direction relative to the lock base 40, the fit-in hole 56 rotates and is displaced in the pull-out direction with respect to the fixing hole 52 shown in FIG. 3B. In this way, the distance from the fixing hole 52 to the fit-in hole 56 increases. As described above, the fixing portion 64 of the wire 60 is inserted and fixed in the fixing hole 52, and the fit-in portion 66 of the wire 60 is fit into the fit-in hole 56. However, the fixing portion 64 and the fit-in portion 66 are integral via the curved portion 62, and the length of the curved in portion 62 is constant. Therefore, basically, the fit-in portion 66 cannot follow the rotational displacement of the fit-in hole 56 with respect to the fixing hole 52. Accordingly, when the fit-in hole 56 rotates in the pull-out direction relative to the fixing hole 52, the fit-in portion 66 of the wire 60, which is fit into the fit-in hole 56, is deformed along the guide groove 54 and pulled-out while being strongly rubbed by an opening edge 56A of the fit-in hole 56, the end surface 44A of the large diameter portion 44, and a transverse direction outer side wall portion 54A of the guide groove 54. (Namely, the forcibly pulling-out device in the claims is formed by the opening edge 56A, the end surface 44A and the wall portion 54A in the present embodiment.)

The deformation load, which is applied in order for the fit-in portion 66 to be strongly rubbed and deformed while being pulled-out from the fit-in hole 56, is added to the aforementioned twisting load, and the resultant total load becomes the force limiter load. While the force limiter load is being applied to the vehicle occupant via the webbing belt 22, the spool 20 is rotated in the pull-out direction relative to the lock base 40, and the webbing belt 22 is pulled-out. For this reason as well, the energy absorption effect can be increased.

Further, for example, if the fit-in portion 66 is completely pulled-out from the fit-in hole 56 before the twisting deformation of the torsion bar 24 is completed, thereafter, the aforementioned deformation load disappears. Thus, the force limiter load applied to the webbing belt 22 is only the twisting load of the torsion bar 24. In this way, in the present webbing retractor 10, by adjusting the length of the fit-in portion 66 in advance, changes in the overall force limiter load can be adjusted.

If the deformation load at the time of strongly rubbing and deforming the wire 60 is merely added to the twisting load of the torsion bar 24, the same effects as those of the present embodiment can be obtained even if, in a normal state, the fixing hole 52 and the fit-in hole 56 communicate coaxially, and one end of a wire, which is formed overall in a straight rod shape, is inserted and fixed in the fixing hole 52, and the other end thereof is fit into the fit-in hole 56.

However, in the case of such a structure, shearing stress 17, concentrates at the wire 60 due to the spool 20 rotating in the pull-out direction relative to the lock base 40. Further, when the concentration of this shearing stress becomes excessively large, the wire breaks at the portion at which the stress concentrates. If the wire breaks, thereafter, no deformation due to strong rubbing arises, and thus, the force limiter load suddenly decreases.

Thus, in the present webbing retractor 10, the curved portion 62 is provided between the fixing portion 64 and the fit-in portion 66. The fit-in portion 66, which is strongly rubbed and deformed while being pulled-out from the fit-in hole 56 at the time when the spool 20 rotates in the pull-out direction relative to the lock base 40, deforms along an imaginary line extending from the curved portion 62. (Namely, the fit-in portion 66 deforms along the guide groove 54.) Even if the curved portion 62 is made to be one portion of the fit-in portion 66, the curved portion 62 can be considered to be the final portion of the deformation of the fit-in portion 66 which is strongly rubbed and deformed by being pulled-out from the fit-in hole 56, and the entire wire 60 can be considered to be in the midst of deforming due to being strongly rubbed. In this way, by forming the wire 60 in advance in a configuration in the midst of being deformed due to strong rubbing, breakage of the wire 60 due to shearing stress concentrating at a portion of the wire 60 can be prevented. Accordingly, the deformation load which is applied to the wire 60 can be reliably applied as the force limiter load until the position of relative rotation of the spool 20 with respect to the lock base 40, which position is set in advance.

In the present embodiment, the fixing portion 64 of the wire 60 is set at the side of the large diameter portion 44 of the lock base 40, and the fit-in portion 66 is set at the spool 20 side. However, conversely, the fixing portion 64 can be set at the spool 20 side and the fixing hole 52 formed in the spool 20, and the fit-in portion 66 can be set at the side of the large diameter portion 44 of the lock base 40 and the fit-in hole 56 formed in the large diameter portion 44.

Further, in the present embodiment, the guide groove 54 is formed in the spool 20. However, the guide groove 54 may be formed in the large diameter portion 44 of the lock base 40. Moreover, the guide groove 54 may be structured so as to be appropriately divided between the lock base 40 and the spool 20. (Namely, the guide groove 54 may be formed by matching substantially annular or arcuate grooves formed in the lock base 40 and the spool 20, respectively.)

As described above, in the present invention, energy absorption due to deformation of the energy absorbing member can be added to the absorbing of energy due to twisting deformation of the torsion bar. Thus, the overall absorbed energy amount can be increased. Further, the energy absorbing member can be preventing from breaking while in the midst of absorbing energy.

Thus, energy can be absorbed reliably.

What is claimed is:

1. A webbing retractor which is a retractor of a webbing belt which is elongated and belt-shaped and restrains a body of a vehicle occupant in a state in which the webbing belt is applied to the vehicle occupant, said webbing retractor comprising:

(a) a take-up shaft to which a proximal end portion of the webbing belt is anchored, and due to the take-up shaft rotating in one direction around an axis of the take-up shaft, the take-up shaft takes-up the webbing belt from a proximal end side, and due to tensile force, toward a distal end side which is a side opposite to the proximal end portion, being applied to the webbing belt, rotational force in a pull-out direction, which is a direction opposite to a take-up direction, is applied to the take-up shaft;

(b) a rotating body which is provided at a side of an axial direction the take-up shaft so as to be coaxial with and freely rotatable with respect to the take-up shaft;

(c) a lock device which restricts rotation of the rotating body at a time a vehicle rapidly decelerates;

(d) an energy absorbing member having a fixing portion which is provided eccentric to the take-up shaft and which is fixed to one of the take-up shaft and the rotating body, and the energy absorbing member has a curved portion which is bent from the fixed portion and which curves around an axial center of the take-up shaft in a direction of rotation of another of the take-up shaft and the rotating body with respect to the one of the take-up shaft and the rotating body at a time when the take-up shaft rotates in the pull-out direction relative to the rotating body, and the energy absorbing member has a fit-in portion which is bent from an end portion of the curved portion at a side opposite the fixing portion and which is inserted into the other of the take-up shaft and the rotating body; and (e) a forcibly pulling-out device which, as the take-up shaft rotates in the pull-out direction relative to the rotating body, rotates and pulls the fit-in portion out of the other of the take-up shaft and the rotating body, and forcibly curves the fit-in portion along an extension of a direction of curving of the curved portion.

2. A webbing retractor according to claim 1, wherein the one of the take-up shaft and the rotating body has a groove which includes a wall portion at an end surface at a side at which the take-up shaft and the rotating body face one another, and a fit-in hole.

3. A webbing retractor according to claim 2, wherein the groove is formed coaxially with an axial center of the take-up shaft or rotating body at which the groove is formed.

4. A webbing retractor according to claim 3, wherein the groove is substantially annular.

5. A webbing retractor according to claim 4, wherein a radius of the groove is the same as an amount by which the fixing hole is eccentric from an axial center of the take-up shaft and the rotating body.

6. A webbing retractor according to claim 3, wherein the fit-in hole opens at a bottom portion of the groove, and an opening direction of the fit-in hole is an axial direction of the take-up shaft or rotating body at which the groove is formed.

7. A webbing retractor according to claim 6, wherein the one of the take-up shaft and the rotating body has a fixing hole which is eccentric from an axial center of the take-up shaft and the rotating body and which opens at an end surface at a side at which the take-up shaft and the rotating body face one another.

8. A webbing retractor according to claim 7, wherein when the take-up shaft and the rotating body are connected, the groove and the fixing hole overlap, and are displaced, from the fit-in hole, by a predetermined angle in the pull-out direction of the webbing belt.

9. A webbing retractor according to claim 8, wherein even in a case in which the take-up shaft and a rotating body are connected and rotate relatively, the groove and the fixing hole always overlap.

10. A webbing retractor according to claim 9, wherein the energy absorbing member is disposed within the groove.

11. A webbing retractor according to claim 10, wherein the fixing portion is inserted and fixed in the fixing hole, and the fit-in portion is accommodated in the fit-in hole so as to be freely slidable.

12. A webbing retractor according to claim 11, wherein the curved portion corresponds to a curvature of the groove.

13. A webbing retractor according to claim 12, wherein an entire length of the curved portion corresponds to a length from the fixing hole to the fit-in hole in the pull-out direction of the webbing.

14. A webbing retractor according to claim 13, wherein the forcibly pulling-out device is an opening edge of the fit-in hole, a wall portion of the groove, and an end surface of one of the take-up shaft and the rotating body which faces the groove.

* * * * *